Figure 3:
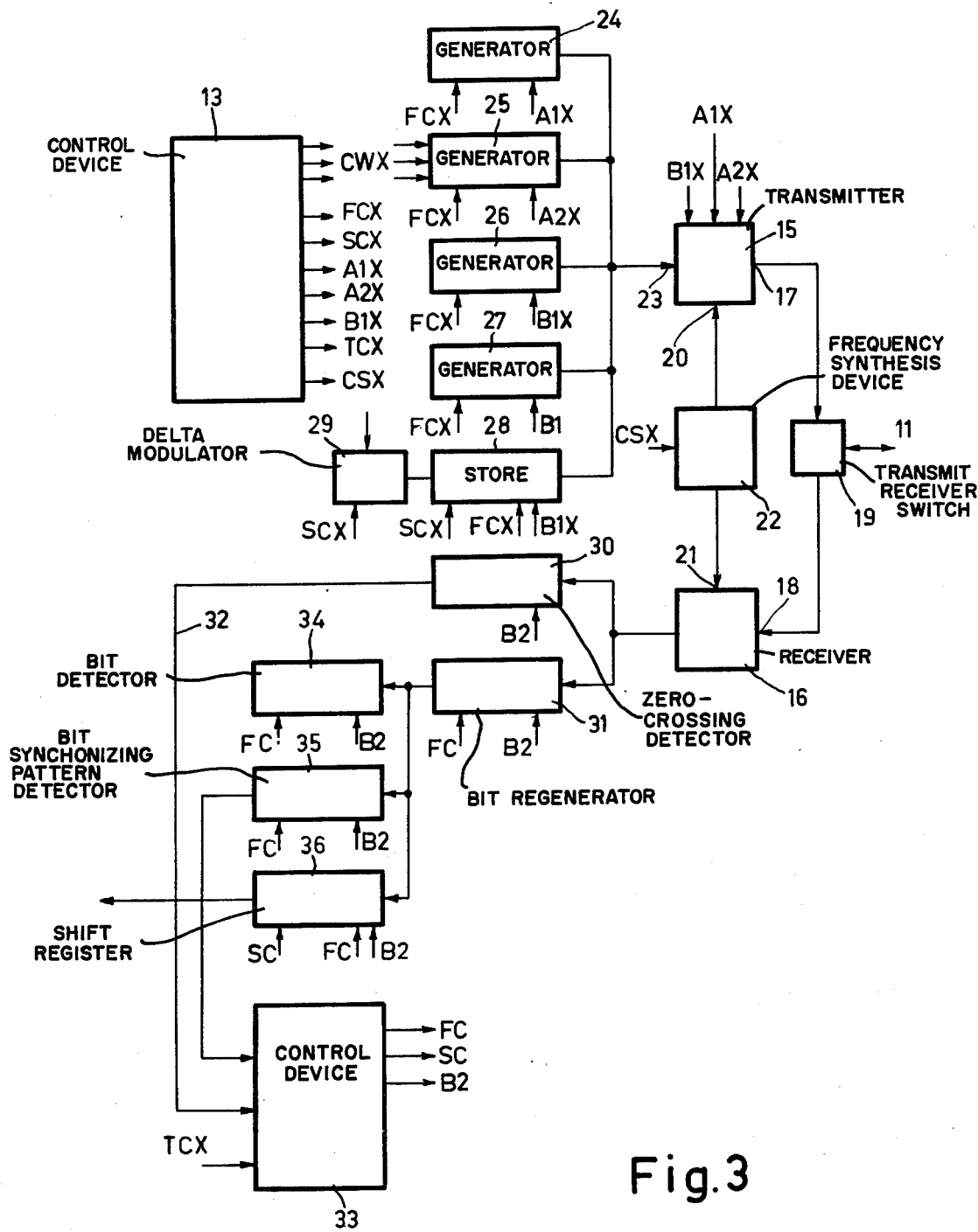

United States Patent [19]
van Leeuwen

[11] 4,031,330
[45] June 21, 1977

[54] DIGITAL RADIO TRANSMISSION SYSTEM

[75] Inventor: Johannes Cornelis van Leeuwen, Hilversum, Netherlands

[73] Assignee: U.S. Philips Corporation, New York, N.Y.

[22] Filed: June 5, 1975

[21] Appl. No.: 584,187

[30] Foreign Application Priority Data
June 10, 1974 Netherlands ............... 7407717

[52] U.S. Cl. .................. 179/41 A; 179/15 BZ; 343/178
[51] Int. Cl.² ................................. H04J 3/12
[58] Field of Search ............ 179/15 BZ, 15.55 T, 179/15 AC, 41 A, 18 FC; 343/178; 325/4; 340/147 SY, 155

[56] References Cited
UNITED STATES PATENTS

| | | |
|---|---|---|
| 3,150,374 | 9/1964 | Sunstein ............... 179/15.55 T |
| 3,529,243 | 9/1970 | Reindl ............... 343/178 |
| 3,671,865 | 6/1972 | Szumila ............... 343/178 |
| 3,827,052 | 7/1974 | Tanaka ............... 343/178 |
| 3,924,077 | 12/1975 | Blakeslee ............... 179/18 FC |

*Primary Examiner*—David L. Stewart
*Attorney, Agent, or Firm*—Frank R. Trifari; Daniel R. McGlynn

[57] ABSTRACT

A digital radio transmission system including a master station and a plurality of slave stations, in which the transmit and receive periods of all the slave stations are under control of the master station. The durations and instants of occurrence of time frames are determined by a frame synchronizing pattern which is periodically transmitted by the master station on all channel frequencies of the system. The master station also transmits signalling code words for each channel frequency in fixed time slots within the frame duration as determined by successive frame synchronizing patterns.

10 Claims, 4 Drawing Figures

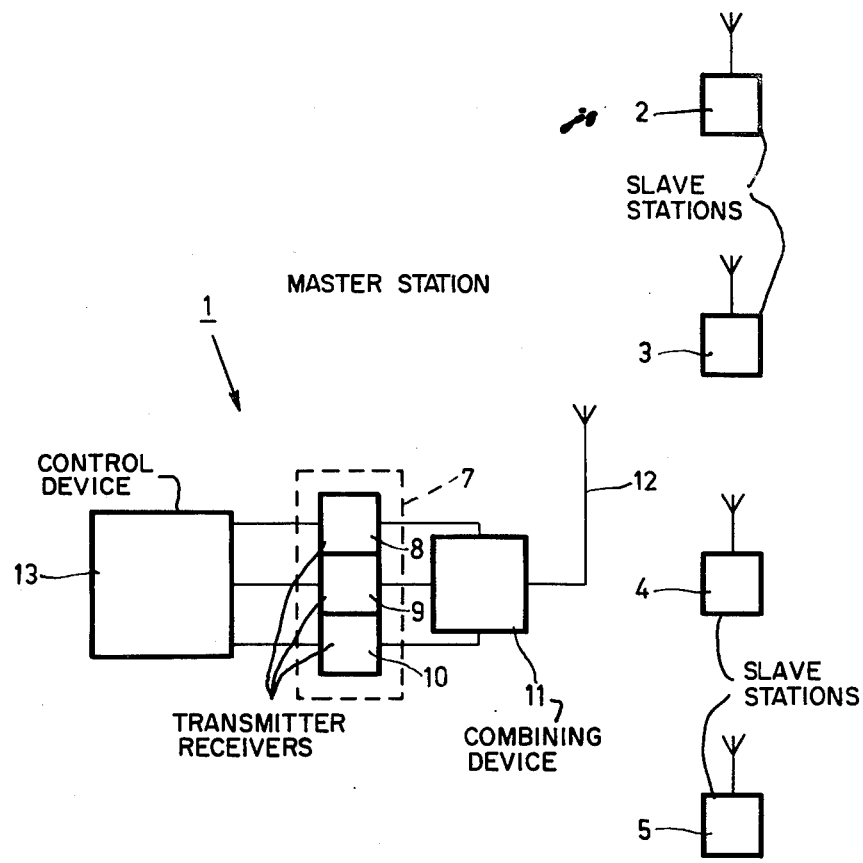
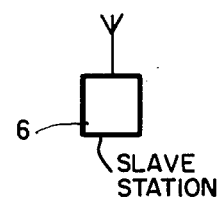
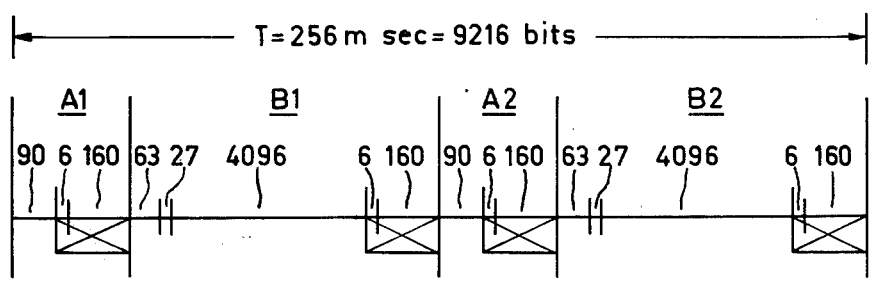
Fig.1
Fig.2

DIGITAL RADIO TRANSMISSION SYSTEM

The invention relates to a radiotelephone system comprising a master station and a plurality of slave stations said master station comprising transmit-receive apparatus adapted to provide for the transmission of time-compressed digital signals via a plurality of simultaneously generated carrier frequencies, each said slave station comprising a transmit-receive apparatus for the transmission and reception of time-compressed digital signals, communication between slave stations of said system being carried on in successive transmit and receive periods occurring within repetitive cycles or frames under the control of said master station.

For such systems the control of the transmit and receive periods of the slave stations by the master station is of importance inter alia in connection with the necessary monitoring and supervision which the master station must be capable of performing.

In a known system of the aforementioned type control of the transmit and the receive periods of a plurality of mobile slave stations is obtained in that the stationary master station acts as a relay station for each two communicating slave stations.

A disadvantage of this known system is the comparatively wide frequency band required, because for each pair of mobile slave stations which communicate with one another via the relaying master station at least two different carrier frequencies are required, and moreover additional bandwidth is required because the master station requires in addition a separate signalling transmit-receive apparatus to permit complete control from the master station.

Another disadvantage is that in spite of the required large bandwidth the flexibility of this known system is poor, because to each of the mobile stations only a single predetermined carrier frequency allocated to it is available, so that in the case of interferences there is no alternative.

It is an object of the present invention to provide another concept of a system of the aforementioned type in which the following advantages are obtained in combination:
1. Optimal utilization of the available frequency band;
2. extensive highly flexible control and management from the main station;
3. in the case of channel disturbance the possibility of switching to an undisturbed channel.

According to the invention such a radiotelephone system is characterized in that the master station comprises a generator for generating a frame synchronizing pattern, a generator for generating a plurality of different code words each representative of a given signalling function, switching means for connecting the said generators to the transmitter and a control device the output signals of which so operate the said switching means that the frame synchronizing pattern is periodically transmitted simultaneously on each said generated carrier frequencies and a plurality of signalling code words selected as required for each carrier frequency are periodically transmitted in fixed time intervals situated within the frame duration determined by successive frame synchronizing patterns, while the receiver in each slave station comprises a channel selection device which in a first operating condition tunes the receiver successively to each of the carrier frequencies of the system for a given short time, a first detection device connected to the receiver and serving to detect the frame synchronizing pattern transmitted via the received carrier, the detection resulting in a switching signal by means of which the channel selection device is set to a second operating condition in which the receiver remains tuned to the particular received carrier frequency, a second detection device for detecting the signalling code words transmitted via the received carrier, a local time control device which is rendered operative by said switching signal and divides the frame duration determined by successive frame synchronizing patterns into a transmit time slot, a receive time slot and a plurality of time slots for detecting the said signalling code words, and a device which in response to the detected code words performs the signalling functions specified thereby.

Figure 4:
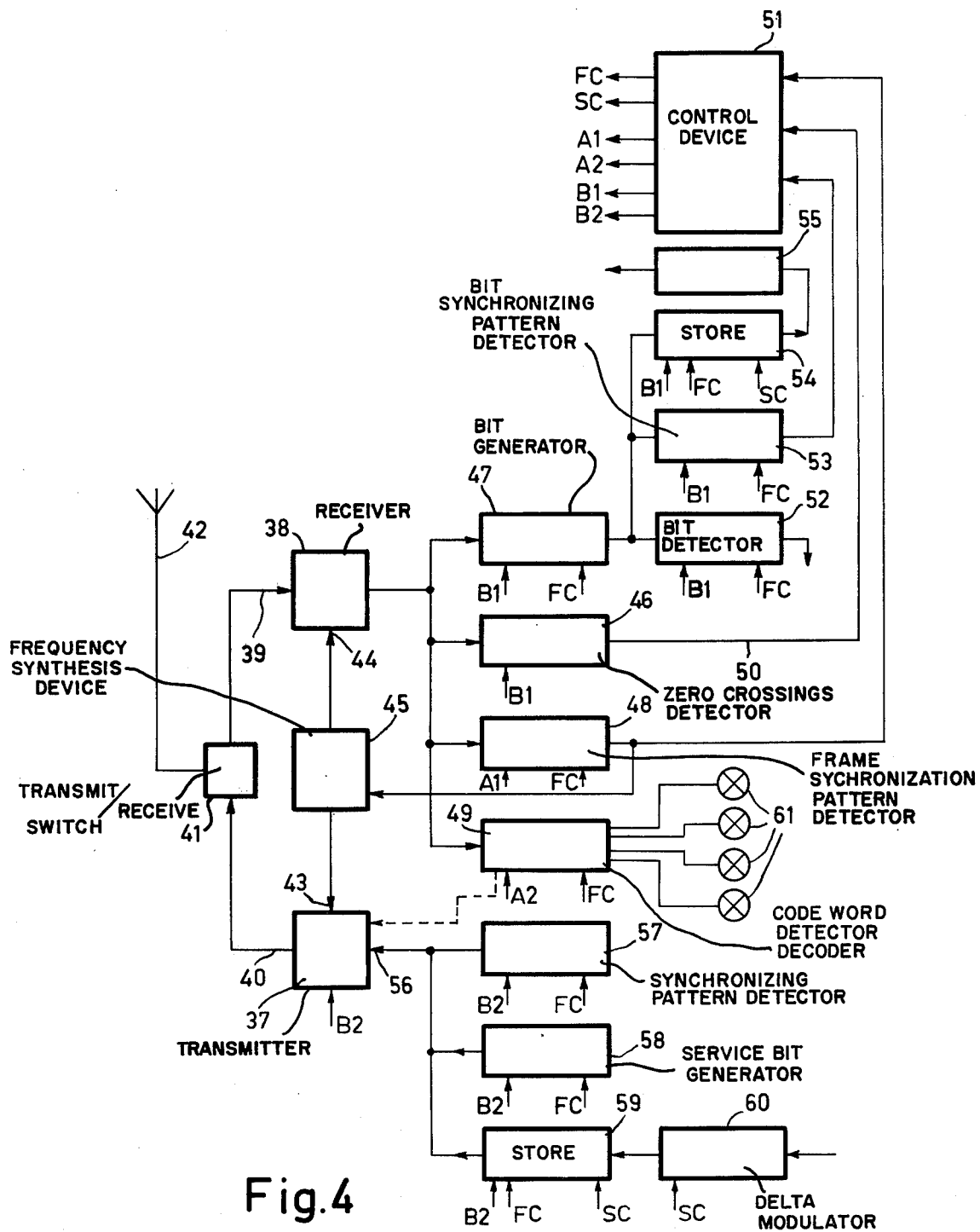

An embodiment of the invention will now be described, by way of example, with reference to the accompanying diagrammatic drawings, in which FIG. 1 is a schematic block diagram of a ratiotelephone system, FIG. 2 is a diagram which shows a possible schedule of the transmit and receive periods of the stations of FIG. 1 for one complete time frame, FIG. 3 is a block schematic diagram of an embodiment of a transmitter-receiver used in the master station of FIG. 1, and FIG. 4 is a block schematic diagram of an embodiment of a transmitter-receiver as used in the slave stations of FIG. 1.

Referring now to FIG. 1, the system shown comprises a master station 1 and five mobile slave stations 2, 3, 4, 5 and 6 which are arbitrarily positioned within the range of reception of one another and of the master station. In practice the system would generally comprise more than five mobile slave stations, but the principle of operation of the system is the same regardless of the number of slave stations involved. The master station comprises a transmit-receive apparatus 7 consisting of a plurality of transmitter-receivers of identical design, the number of these transmitter-receivers in general being small than the number of slave stations forming part of the system. For example, in the system shown in the Figure the transmit-receive apparatus 7 comprises three transmitter-receivers 8, 9 and 10 which are arranged for transmitting time-compressed digital information signals via different carrier frequencies $f_1$, $f_2$ and $f_3$. For this purpose each of the transmitter-receivers is provided with a pulse code modulator. This modulator is designed for digitally controlled delta modulation in which the dynamic range is controlled by means of a control signal which is derived from the pulse train to be transmitted. Such a digitally controlled delta modulation system is described more in detail, for example, in U.K. Patent No. 1,261,951 (PHN 4860) and No. 1,294,048 (PHN 4860). The frequency at which the signals to be transmitted are sampled may be assumed to be 16 kHz.

The transmitter-receivers 8, 9 and 10 are connected to a common aerial 12 by a combining device 11.

The mobile slave stations 2, 3, 4, 5 and 6 each have a transmitter-receiver of a design substantially equal to the transmitter-receivers used in the master station 1. The frequency multiplex system described sofar is adapted to provide for duplex traffic using time division.

The system organization is entirely controlled by the master station 1 which for this purpose comprises a control device 13. Under all operating conditions of the system this control device controls the time division by means of a frame synchronizing pattern which is periodically transmitted simultaneously on all the carrier frequencies $f_1, f_2, f_3, \ldots$ generated in the master station, and controls the traffic by means of signalling code words which are selected as required for each carrier frequency and are transmitted in fixed time intervals situated within the frame duration determined by the successive frame synchronizing patterns.

FIG. 2 illustrates the time division and control which is performed by the master station 1 and is represented by a time frame which applies to all operative stations and has a duration T of 256 milliseconds. In the particular division of the time frame T illustrated, the latter comprises four time slots $A_1$, $A_2$, $B_1$ and $B_2$. The time slots $B_1$ and $B_2$ are transmit/receive time slots. The time slots $A_1$ and $A_2$ are time slots in which the master station transmits the frame synchronizing information and the control information on all the carrier frequencies generated in the master station. More particularly each time frame T begins with the time slot $A_1$, the duration of which corresponds to 256 bits, the first 90 bits of which only are simultaneously transmitted by the master station on all the generated carrier frequencies. These 90 bits constitute the frame synchronizing pattern which comprises a maximum-length sequence of 15 units of 6 bits each. Of the remaining time, which corresponds to 166 bits, the part which corresponds to the first 6 bits serves as a time delay for bridging the time required for transmission from the master station to the most remote slave station. These 6 bits correspond to a time of about 166.67 microseconds, which means that a time corresponding to a path length of about 50 km can be accommodated. The time corresponding to the remaining 160 bits, about 4.44 milliseconds, serves to accommodate the time required for switching from transmitting to receiving and vice versa.

The time slot $A_2$ may if desired immediately follow the time slot $A_1$, however, preferably this time slot is inserted between the time slots $B_1$ and $B_2$, as is shown in FIG. 2. The duration of the time slot $A_2$ again corresponds to 256 bits, only the first 90 of which are transmitted by the main station. These 90 bits comprise 15 units of 6 bits each divided into three signalling code words of 5 units each. The signalling code words thus transmitted within the band can be selected in the master station as required for each carrier frequency from a plurality of available code words each representing a given signalling function, which permits of particularly flexible radio traffic control. To illustrate this high flexibility the following Table shows some of the signalling possibilities which the system can offer The remainder of the time slot $A_2$ again is divided into a time corresponding to 6 bits for bridging the path length and a time corresponding to 160 bits for accommodating the switch from transmission to reception and vice versa.

In each of the time slots $B_1$ and $B_2$ 4,352 bits can occur which include 4,096 information bits which are preceded by 90 bits the first 63 of which serve for bit synchronization while the remaining 27 are service bits (channel associated signalling). The time corresponding to the remainder, 166 bits, again serves to bridge the path length and to accommodate the time of switching from transmission to reception and vice versa.

Radio communication between one or more pairs of mobile slave stations and/or between the master station and one or more mobile slave stations can take place in the time slots $B_1$ and $B_2$. For each pair of communicating stations only one of the carrier frequencies $f_1, f_2, f_3, \ldots$ is required, because for each pair of communicating stations (for example the mobile slave stations 2 and 6 in FIG. 1) the condition applies that the first station 2 transmits and the second station 6 receives in one time slot, for example the time slot $B_1$, whereas the said second station 6 transmits and the said first station 2 receives in the other time slot $B_2$.

With the sampling frequency of 16 kHz used in the present system a time frame of 256 ms could contain only 4,096 bits. However, the time frame of 256 ms shown in FIG. 2 comprises 9.216 bits. This is made possible by the use of time compression during transmission. The compression factor is equal to $(9,216/4,096) = 2.25$, from which it follows that the speed at which the bits are transmitted must be equal to $2.25 \times 16$ kHz $= 36$ kbits/sec.

The time compression required at the transmitter end and the expansion required at the receiver end may readily be realized by providing each station with a buffer store having a capacity of 4,096 bits. The 4,096 information bits which appear at the output of the delta modulator in each time frame are continuously written into such a store at a clock frequency which corresponds to the sampling frequency of 16 kHz and are read and transmitted at the higher clock frequency of 36 kHz in the next time frame during the time slot $B_1$ or $B_2$ available for transmission. In the receiving station the 4,096 bits which are received in the same time slot are stored at the high clock frequency of 36 kHz in a store which is continuously being read at the low clock frequency of 16 kHz. It should be mentioned that in this mode of transmission the communicating parties may talk simultaneously, each being heard by the other. Although the transmitter and receiver of each station operate alternately, the time compression of the signals before transmission and the time expansion of the signals after reception ensure that the system has the useful properties of a full duplex system.

FIG. 3 shows a transmitter-receiver as used in the master station. The master station 1 of FIG. 1 comprises a plurality of these transmitter-receivers which all are controlled by the common control device 13. As FIG. 3 shows, this control device has a plurality of outputs indicated by reference letters which correspond to the control signals which appear at these outputs and are generated in known manner by means of a clock pulse generator and a plurality of frequency dividers. Thus at an output designated FCX the control

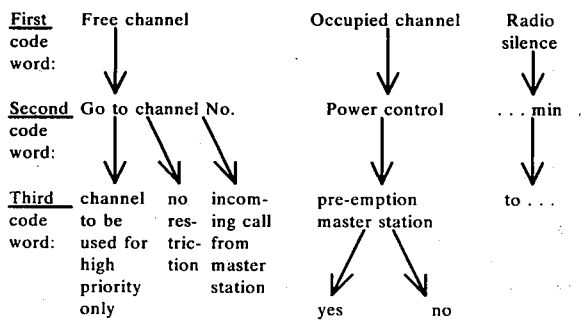

device delivers a fast clock signal FCX having a frequency of 36 kHz derived from a clock pulse generator. From the 36 kHz clock signal the frequency dividers in the control device produce a slow clock signal SCX of 16 kHz and gating signals A1X, A2X and B1X which in duration and instant of occurrence determine the time slots $A_1$, $A_2$ and $B_1$ respectively of the time frame T of FIG. 2. In addition, the control device 13 at a plurality of outputs CWX, only three of which are shown, delivers control signals CWX which are indicative of the signalling code words selected as required either by an operator or remotely by electronic means.

Finally the control device 13 produces two control signals TCS and CSX the functions of which will be set out more fully hereinafter.

In FIG. 3 the transmitter proper and the receiver proper are designated by 15 and 16 respectively. The output 17 of the transmitter 15 and a first input 18 of the receiver 16 are connected to the combining device 11 of FIG. 1 through a transmit-receive switch 19.

A carrier signal is applied to a first input 20 of the transmitter 15 and a local oscillator signal is applied to a second input 21 of the receiver 16, which two signals are generated by means of a frequency synthesis device 22 under the control of the control signal CSX which is supplied by the control device 13 and is indicative of a carrier frequency to be selected.

The carrier signal can be modulated in a transmitter by the digital signals to be transmitted which are applied to a second input 23 of the transmitter 15 under the control of the control device 13 which ensures that the synchronization information and the control information are transmitted in the time slots A1 and A2 respectively and that the transmission of the actual information which may be transmitted by the master station takes place in the time slot $B_1$.

For generating the digital signals to be transmitted the apparatus shown in FIG. 3 further comprises four generators 24, 25, 26 and 27, a store 28 and a delta modulator 29 connected to the input of the store. The generator 24 is contructed to produce the 90 bits of frequency 36 kHz which are to be transmitted in the time slot $A_1$ and form the frame synchronizing pattern. The generator 25 is arranged to generate, under the control of the clock signal FCX of 36 kHz, the 90 bits which are to be transmitted in the time slot $A_2$ and form three signalling code words which have been selected from a larger number of signalling code words by means of control signals CWX applied to the generator 25. The generator 26 is arranged to generate the bit synchronizing pattern, which comprises 63 bits, and the generator 27 is arranged to generate the 27 bits. The store 28 has a storage capacity of 4,096 information bits. In the delta modulator 29 any speech signal to be transmitted is sampled by means of the 16 kHz clock signal SCX supplied by the control device 13. The digital signal which appears at the output of the delta modulator 29 and the bits of which occur at the clock frequency of 16 kHz is written at the same frequency in the store 28 which is in the form of a shift register. The output circuit of each of the generators 24, 25, 26 and 27 and the output circuit of the store 28 each comprise a gate circuit (not shown). The gate circuits form switching means which are controlled by the control device 13. For example, the generator 24 is connected through its output gate to the second input of the transmitter 15 when this output gate is opened by the control signal A1X the instant of occurrence and the duration of which correspond to the time slot $A_1$ of FIG. 2.

In an entirely similar manner the generators 26 and 27, the store 28 and the generator 25 are successively connected to the second input of the transmitter 15 by the control signals B1X and A2X applied to the relevant output gates. It should be mentioned that the information bits which have been stored in the store at a bit frequency of 16 kHz are read out during the time slot $B_1$ at the high clock frequency FCX of 36 kHz.

A zero-crossings detector 30 and a bit regenerator 31 are connected in parallel to the output of the receiver 16. The output pulses of the zero-crossings detector are applied through a line 32 to an individual control device 33. A service bit detector 34, a bit synchronizing pattern detector 35 and a store 36 in the form of a shift register are connected in parallel to the output of the bit regenerator 31. The pulses produced at the output of the detector 35 on detection of the bit synchronizing pattern are applied to the said individual control device 33 to which is also applied a control signal TCX derived from the common control device 13.

The individual control device 33 is arranged to produce, in response to the signals applied to it, local clock signals FC and SC which are equal in frequency to the 36 kHz clock signal FCX and the 16 kHz clock signal SCX respectively generated in the common control device 13, but correspond in phase to the phase of the digital signals received. The individual control device is further arranged to derive the control signal $B_2$ from the 36 kHz clock signal by means of dividers.

The detectors 30, 34 and 35, the bit regenerator 31 and the store 36 each have an input circuit in the form of a gate circuit (not shown). These gate circuits form switching means which are controlled by the control signal B2 produced in the individual control unit 33.

The bit regenerator 31, the two detectors 34 and 35 and the store 36 also have the 36 kHz clock signal FC produced by the individual control device 33 applied to them, while the store is continuously being read at the low clock frequency SC of 16 kHz which is also produced by the individual control unit 33.

FIG. 4 shows a transmitter-receiver as used in a mobile slave station. The construction of this transmitter-receiver largely corresponds to that of the transmitter-receivers used in the master station.

In FIG. 4 the transmitter proper and the receiver proper are designated by 37 and 38 respectively. The output 40 of the transmitter 37 and a first input 39 of the receiver 38 are connected to an aerial 42 via a transmit-receive switch 41. A carrier signal is applied to a first input 43 of the transmitter 37 and a local oscillator signal is applied to a second input 44 of the receiver 38, which signals are both derived from a frequency synthesis device 45 which includes a channel selecting device by means of which the carrier frequency and the frequency of the local oscillator signal can be selected from a plurality of possible frequencies.

To the output of the receiver 38 are connected in parallel to a zero-crossings detector 46, a bit regenerator 47, a frame synchronizing pattern detector 48 and a signalling code word detector and decoder 49. The output pulses from the zero-crossings detector 46 are applied through a line 50 to an individual control device 51. The pulses which appear at the output of the detector 48 on detection of the frame synchronizing pattern are applied to the said control device 51 and also to the frequency synthesis device 45. To the output of the bit generator 47 are connected in parallel a service bit detector 52, a bit synchronizing pattern detector 53 and a store 54 in the form of a shift register. The pulses which appear at the output of the detector 53 on detection of the bit synchronizing pattern are applied to the individual control device 51. This control device is arranged to produce from the signals applied to it the local clock signals FC and SC which are equal in frequency to the 36 kHz clock signal FCS and to the 16 kHz clock signal SCX respectively generated in the common control device 13 of the main station, but which correspond in phase to the phase of the digital signals received. The control device 51 is also arranged to produce the control signals $A_1$, $A_2$, $B_1$ and $B_2$ from the 36 kHz clock signal FC by means of dividers. The detectors 46, 48, 49, 52 and 53, the bit regenerator 47 and the store 54 each are provided with an input circuit in the form of a gate circuit (not shown).

These gate circuits constitute switching means which are controlled by control signals generated in the control device 51. Thus the gate circuits of the frame synchronizing pattern detector 48 and of the signalling code word detector 49 are controlled by the control signals $A_1$ and $A_2$ respectively derived from the control device 51, while the gate circuits of the detectors 46, 52 and 53 and those of the bit regenerator 47 and the store 54 are all controlled by the control signal $B_1$ (or $B_2$) derived from the control device 51.

The 36 kHz clock signal FC derived from the control device 51 is applied to the detectors 48, 49, 52 and 53, to the bit regenerator 47 and to the store 54, while the 16 kHz clock signal SC by which the store 54 is continuously being read is also derived from the control device 51. The resulting digital signal at the output of the store is applied for demodulation to a delta demodulator 55.

To a second input 56 of the transmitter 37 are connected in parallel a bit synchronizing pattern detector 57, a service bit generator 58 and a store 59 in the form of a shift register. To the input of the store is connected a delta modulator 60 to which is applied the 16 kHz clock signal SC derived from the control device 51 for sampling an input signal applied to the delta modulator. The output circuit of each generator 57 and 58 and that of the store 59 are constituted by gate circuits (not shown). These gate circuits form switching means which are controlled by the control signal $B_2$ (or $B_1$) derived from the control device 51. The said generators 57 and 58 and the store 59 also have the 36 kHz clock signal FC derived from the control device 51 applied to them and in addition the store 59 has the 16 kHz clock signal SC applied to it.

Assuming the master station to be operating and hence transmitting the frame synchronizing pattern and a plurality of signalling code words on all its channel frequencies, the operation of the transmitter receiver of a mobile slave station shown in FIG. 4 can be described as follows.

After the transmitter-receiver in the slave station has been switched on, all the gate circuits are closed with the exception of the input gate of the frame synchronizing pattern detector 48 which is continuously open. The control circuit of the frequency synthesis device 45 causes one of the channel frequencies of the system to be selected. Because the input gate of the detector 48 is open, this detector ascertains whether the frame synchronizing pattern is received on the selected channel frequency. If the detector 48 does not detect the frame synchronizing pattern within a given time, the control circuit of the frequency synthesis device 45 causes another channel frequency to be selected. If the detector 48 detects the frame synchronizing pattern, it produces an output signal which causes the frequency synthesis device 45 to remain tuned to the selected channel frequency and also causes the control device 51 to supply the control signals $A_1$, $A_2$, $B_1$ and $B_2$. The control signal $A_2$ opens the input gate of the signalling code word detector and decoder 49 so that the signalling code words transmitted at the received channel frequency are detected and decoded. The signalling functions specified by the decoded code words can be indicated, for example, by means of indicator lamps 61 connected to the output of the decoder 49. The output signals from the decoder 49 may also be used to cause given signalling functions to be performed. For example, the master station may inform the relevant mobile slave station by means of the transmitted signalling code words that the selected channel is reserved for high-priority calls or that the selected channel is temporarily occupied and that the receiver is to be tuned to a given other channel frequency which is automatically selected due to a simultaneously transmitted signalling code. For example, all the mobile slave stations which form part of the system and are operational may thus be directed to the same channel frequency to wait for a call at this frequency. A connection between two mobile slave stations under the control of the master station may then simply be established, for example in that the master station directs the stations which are not called to another free channel frequency to wait for any calls. The initial channel thus is available for the connection between the two mobile slave stations, one station, for example the calling slave station, using the time slot $B_1$ as a transmitting time slot according to a fixed system convention according to which the other slave station uses the time slot $B_2$ as the transmission time slot, as is the case in FIG. 4.

When a signal is received in the time slot $B_1$ the zero-crossings detector 46 connected to the receiver 38 delivers pulses which occur at a frequency of 36 kHz. These pulses are applied through line 50 to control device 51 in which they are used to correct the phase of the locally generated 36 kHz clock signal FC by means of a phase-locked loop so that the frequency and the phase of the clock signal FC are equal to the frequency and phase of the received bits. The signal received in the time slot $B_1$ is also applied via the bit regenerator 47 to the bit synchronization pattern detector 53, to the service bit detector 52 and to the store 54. The bit synchronization pattern detector 53 searches for the special pattern of 63 bits to determine the bit numbering. The service bit detector 52 detects the service bits which have a channel-associated signalling function. The information bits received in the time slot $B_1$ can now be written in the store 54 by means of the 36 kHz clock signal FC to be continuously read by means of the slower 16 kHz clock signal SC and to be applied to the delta demodulator 55/

In the opposite direction the information bits which appear at the output of the delta modulator 60 are written in the store 59 by means of the 16 kHz clock signal SC so as to be read and transmitted at the 36 kHz clock frequency FC in the time slot $B_2$. Prior to these information bits the bits generated by means of the bit synchronization pattern generator 57 and the bits generated by means of the service bit generator 58 will have been transmitted in the time slot $B_2$.

In the aforedescribed radio telephone system optimum utilization of the frequency band available to the system is made possible, since for each connection only a single channel frequency is required. Moreover the use of additional time slots permits of establishing a connection between two mobile slave stations the main under continuous control (supervision, direction of the master station). Since this control is effected from the master station by signalling code words transmitted in the said additional time slots and because the control functions specified by these code words can be selected in accordance with the requirements to be satisfied by the system, a particularly flexible system is obtained.

The particular flexibility of this system can further be illustrated by the fact that the radio telephone system described can simply, by the interposition of a time multiplex device, be connected to a stationary telephone network provided that the bit frequency of this network corresponds to that of the radio telephone system.

It should further be mentioned that the invention is not restricted to the aforedescribed subdivision of the time frame T in which all the signalling code words transmitted in each time frame are transmitted in a single time slot $A_2$ situated between the transmission and reception time slots $B_1$ and $B_2$ respectively. For example, it is possible not only for all signalling code words in each time frame to be transmitted in a time slot $A_2$ which immediately follows the time slot $A_1$ but also for the signalling code words in each time frame to be divided between a time slot $A_2$ immediately following the time slot $A_1$ and a time slot $A_3$ situated between the transmission and the reception time slots $B_1$ and $B_2$ respectively.

Finally it should be mentioned that the invention is not restricted to the clock frequencies of 36 kHz and 16 kHz used in the embodiment described, because other values also may be used.

What is claimed is:

1. A digital transmission system comprising
   a master station having a transmit-receive device for transmission of time-compressed digital signals by means of a plurality of simultaneously generated carrier frequencies, comprising
   first generator means for generating a frame synchronization pattern;
   second generator means for generating a plurality of different signalling code words each representive of a given function;
   switching means for connecting the said generators to the transmitter; and
   control means having an output for operating said switching means for periodically transmitting said frame synchronization pattern simultaneously on each of said generated carrier frequencies, and for periodically transmitting a plurality of signalling code words selected as required for each carrier frequency in fixed time intervals situated within the frame duration determined by successive frame synchronizing patterns; a plurality of slave stations each comprising a transmit-receive apparatus for transmission and reception of time-compressed digital signals under the control of said master station, and
   channel selection means for tuning the receiver in a first operating condition successively for given short periods to each of the carrier frequencies of the system.

2. The system as defined in claim 1, wherein said receiver further comprises
   first detection means connected to said receiver for detecting the frame synchronization pattern transmitted over the carrier frequency received, and for producing a switching signal in response to the detection of said frame synchronization pattern for setting the channel selection device to a second operating condition in which the receiver remains tuned to the received carrier frequency.

3. The system as defined in claim 2, wherein said receiver further comprises
   second detection means for detecting said signalling code words transmitted on the received carrier.

4. The system as defined in claim 2, wherein said receiver further comprises a local time control means rendered operative by said switching signal for dividing the frame duration determined by successive frame synchronizing patterns into a transmission time slot, a reception time slot and a plurality of time slots for the detection of said signalling code words.

5. The system as defined in claim 2, wherein said receiver further comprises means responsive to said detected code words for performing the signalling functions specified.

6. The system as defined in claim 1, wherein said time frame determined by successive frame synchronizing patterns comprises a transmission time slot and a reception time slot separated by a time slot for respectively transmitting and receiving said signalling code words.

7. The system as defined in claim 1, wherein the time frame determined by successive frame synchronizing patterns comprises at least two time slots for the transmission of signalling code words, one of these time slots immediately following the time slot intended for the frame synchronization pattern while the other time slot lies between the transmission time slot and the reception time slot.

8. The system as defined in claim 1, wherein each of said slave stations comprises control means including a clock pulse generator connected in a phase control loop for synchronizing the clock frequency in accordance with the signal received in the reception time slot.

9. The system as defined in claim 8, wherein said control means in each of said slave station comprises means for deriving from said clock frequency control signals for subdividing said time frame into said time slots.

10. The system as defined in claim 1, wherein each of said transmitters includes encoding means and time compression means for encoding signals compressed in time prior to transmission, and wherein easy of said receivers includes time expansion means and decoding means for expanding and decoding the received signals.

* * * * *

UNITED STATES PATENT AND TRADEMARK OFFICE
CERTIFICATE OF CORRECTION

PATENT NO. : 4,031,330
DATED : June 21, 1977
INVENTOR(S) : JOHANNES CORNELIS VAN LEEUWEN It is certified that error appears in the above-identified patent and that said Letters Patent are hereby corrected as shown below:

Column 2, lines 57 and 58, delete "(PHN 4860)"
Column 4, line 22, "2" should be --(2)--
         line 23, "6" should be --(6)--
         line 25, "6" should be --(6)--
                  "2" should be --(2)--
         line 30, "9.216" should be --9,216--
Column 7, line 9, "FCS" should be --FCX--
Column 8, line 61, "55/" should be --55.--
         line 68, "synchronization" should be --synchronizing--

Claim 7, line 6, "frame" should be --frames--

Signed and Sealed this

Twenty-fifth Day of October 1977

[SEAL]

Attest:

RUTH C. MASON
Attesting Officer

LUTRELLE F. PARKER
Acting Commissioner of Patents and Trademarks